(12) United States Patent
Fu et al.

(10) Patent No.: US 7,578,346 B2
(45) Date of Patent: Aug. 25, 2009

(54) METHOD OF PLUGGING FRACTURED FORMATION

(75) Inventors: Diankui Fu, Tyumen (RU); Kreso Kurt Butula, Zagreb (HR)

(73) Assignee: Schlumberger Technology Corporation, Sugar Land, TX (US)

( * ) Notice: Subject to any disclaimer, the term of this patent is extended or adjusted under 35 U.S.C. 154(b) by 13 days.

(21) Appl. No.: 11/557,726

(22) Filed: Nov. 8, 2006

(65) Prior Publication Data

US 2008/0108520 A1 May 8, 2008

(51) Int. Cl.
*E21B 43/267* (2006.01)
(52) U.S. Cl. .............. 166/280.1; 166/293; 507/204
(58) Field of Classification Search .......... 166/280.2, 166/293
See application file for complete search history.

(56) References Cited

U.S. PATENT DOCUMENTS

| | | | | |
|---|---|---|---|---|
| 3,266,573 A | * | 8/1966 | Rixe ................. | 166/280.1 |
| 3,929,191 A | * | 12/1975 | Graham et al. ........ | 166/276 |
| 4,518,039 A | * | 5/1985 | Graham et al. ........ | 166/276 |
| 4,585,064 A | | 4/1986 | Graham | |
| 5,381,864 A | * | 1/1995 | Nguyen et al. ........ | 166/280.1 |
| 5,422,183 A | | 6/1995 | Sinclair | |
| 5,518,996 A | | 5/1996 | Maroy et al. | |
| 6,364,018 B1 | | 4/2002 | Brannon | |
| 7,004,255 B2 | | 2/2006 | Boney | |

FOREIGN PATENT DOCUMENTS

WO 2005110942 A2 11/2005

OTHER PUBLICATIONS

Fracturing Fluid Chemistry and Proppants—By Janet Gulbis, Richard M. Hodge, pp. 7-1 to 7-23, Reservoir Simulation.
SandWedge Conductivity Enhancement Service; Enhances Proppant Pack Conductivity for Improved Long-Term Production. Now available in Lite, Plus, and Max Systems Tailored to Treatment Requirements—H04571 Dec. 5, 2005 Halliburton.
FlexSand LS Additive—Product Service Bulletin—BJ Services Company, Oct. 21, 2002.
U.M. Bazhenov; Technology of the Concrete; pp. 28-30(Russian);—Translation enclosed.

* cited by examiner

*Primary Examiner*—William P Neuder
(74) *Attorney, Agent, or Firm*—Dave Cate; Robin Nava; Rachel Greene

(57) ABSTRACT

A material and method for treating a fractured formation penetrated by a wellbore includes providing a quantity of resin coated particles having a particle size of from about 0.2 mm to about 2.35 mm. A quantity of smaller deformable or non-deformable particles is combined with the resin coated particles to form a generally uniform consolidated particle pack when mixed together and subjected to at least one of heat and pressure. A slurry of the particles is formed with a carrier fluid capable of suspending the particles. The slurry of particles is introduced into the wellbore of the formation. The resin coated particles and smaller deformable particles thus may form a consolidated particle pack in at least a portion of the fractures of the formation.

15 Claims, 1 Drawing Sheet

METHOD OF PLUGGING FRACTURED FORMATION

BACKGROUND

The invention relates to subterranean wells for the injection, storage, or production of fluids. More particularly it relates to plugging fractures in formations in such wells.

Fractures in reservoirs normally have the highest flow capacity of any portion of the reservoir formation. These fractures in the formation may be natural or hydraulically generated. In artificially created fractures, such as those created by hydraulic fracturing or acid fracturing, the high flow capacity results from the fracture being either propped with a permeable bed of material or differentially etched along the fracture face with acid or other material that has dissolved part of the formation.

Fractures of interest in this field are typically connected to the formation and to the wellbore. Large volumes of fluids may travel through fractures due to their high flow capacity. This allows wells to have high fluid rates for production or injection.

In the course of creating or using an oil or gas well, it may be beneficial to plug or partially plug a fracture in the rock formations, thereby reducing its flow capacity. Typically the reasons for plugging these fractures are that a) they are producing unwanted water or gas, b) there is non-uniformity of injected fluid (such as water or $CO_2$) in an enhanced recovery flood, or c) costly materials (such as hydraulic fracturing fluids during fracturing) are being injected into non-producing areas of the formation. This latter case can be particularly deleterious if it results in undesirable fracture growth because at best it wastes manpower, hydraulic horsepower, and materials, to produce a fracture where it is not needed, and at worst it results in the growth of a fracture into a region from which undesirable fluids, such as water, may be produced.

Past techniques for plugging fractures have included injecting cement systems, hydrating clays, and both crosslinked and non-crosslinked polymer systems. The disadvantages of cement systems are the requirements for expensive materials and well work, and the system's inability to travel down the fracture without bridging prematurely. The hydrating clays require the complexity and cost of pumping oil-based systems plus expensive well work. The hydrating clays also have the same problem as the cement with regard to placement: needing to avoid premature bridging; they also have the requirement of needing to hydrate fully along the fracture. The polymer systems often fail due to their lack of flow resistance in very permeable fractures and because the materials are expensive considering the large volumes that are required. There is a need for an inexpensive, reliable, easily placed, effective well plugging material and methods for use during well completion or remediation, especially stimulation, and during fluids production.

SUMMARY

A first embodiment is a method of treating a formation penetrated by a wellbore involving providing a quantity of resin coated particles having a particle size of from about 0.2 mm to about 2.35 mm, and a quantity of smaller particles that form a generally uniform consolidated particle pack when mixed together and subjected to at least one of heat and pressure; forming a slurry of the particles with a carrier fluid capable of suspending the particles; and introducing the slurry of particles into the wellbore of the formation. The resin coated particles and smaller particles form a consolidated particle pack in at least a portion of the formation. In various embodiments: the resin coated particles are used in an amount of from about 30 to about 95 percent by total weight of particles; the smaller particles include particles having a particle size of less than about 0.2 mm; the smaller particles include deformable particles formed from at least one of thermoplastic, resin, rubber, polymers, walnut shells, aluminum and aluminum alloys and plastics; the resin coated particles used in forming the slurry include at least one of pre-cured resin coated particles and non-pre-cured resin coated particles; the resin coated particles used in forming the slurry are non-pre-cured resin coated particles; the particles form a generally uniform consolidated particle pack when subjected to pressure at 90° C. for 20 hours; the smaller particles are at least one of deformable particles and non-deformable particles having a particle size of about 0.2 mm or less; the resin coated particles include resin coated particles having a particle size of from about 1 mm or more and resin coated particles having a particle size of from about 0.2 mm to less than about 1 mm that are used in a ratio of from about 4:1 to about 1:2, respectively, by total weight of particles; the particles provide a particle pack having a void volume of less than about 17% prior to any particle deformation; and the resin coated particles are used in an amount of from about 30 to about 95 percent by total weight of particles, and smaller particles having a particle size of from about 0.1 mm to less than about 0.2 mm are used in an amount of from 0 to about 30% by total weight of particles, and smaller particles having a particle size of less than about 0.1 mm are used in an amount of 0 to about 20% by total weight of particles.

Another embodiment is a method of treating a fractured formation penetrated by a wellbore involving providing a quantity of resin coated particles having a particle size of from about 0.2 mm to about 2.35 mm, and a quantity of smaller deformable particles having a particle size of less than about 0.2 mm that form a generally uniform consolidated particle pack when mixed together and subjected to pressure at 90° C. for 20 hours; forming a slurry of the particles with a carrier fluid capable of suspending the particles; and introducing the slurry of particles into the wellbore of the formation. The resin coated particles and smaller deformable particles form a consolidated particle pack in at least a portion of a fracture of the formation. In various additional embodiments: the resin coated particles are used in an amount of from about 30 to about 95 percent by total weight of particles; the smaller particles include deformable particles formed from at least one of thermoplastic, resin, rubber, polymers, walnut shells, aluminum and aluminum alloys and plastics; the resin coated particles used in forming the slurry include at least one of pre-cured resin coated particles and non-pre-cured resin coated particles; and the resin coated particles used in forming the slurry are non-pre-cured resin coated particles; a quantity of non-deformable inert particles having a particle size of about 0.2 mm or less is included in the slurry; the resin coated particles include resin coated particles having a particle size of from about 1 mm or more and resin coated particles having a particle size of from about 0.2 mm to less than about 1 mm that are used in a ratio of from about 4:1 to about 1:2, respectively, by total weight of particles; the particles provide a particle pack having a void volume of less than about 17% prior to any particle deformation; the resin coated particles are used in an amount of from about 30 to about 95 percent by total weight of particles, and deformable particles having a particle size of from about 0.1 mm to less than about 0.2 mm are used in an amount of from 0 to about 30% by total weight of particles, and deformable particles having a particle size of less than about 0.1 mm are used in an amount of 0 to about 20% by total weight of particles.

Yet another embodiment is a method of treating a formation penetrated by a wellbore involving providing a quantity of coarse particles having a particle size of from about 0.2 mm to about 2.35 mm that includes at least one of resin coated particles and particles having a non-resin deformable coating over a non-deformable core, and a quantity of particles having a particle size of less than about 0.2 mm that includes at least one of deformable and non-deformable particles; forming a slurry of the particles with a carrier fluid capable of suspending the particles; and introducing the slurry of particles into the wellbore of the formation. In various further embodiments: the coarse particles are used in an amount of about 30 to about 95 percent by total weight of particles; the smaller particles include deformable particles formed from at least one of thermoplastic, resin, rubber, polymers, walnut shells, aluminum and aluminum alloys and plastics; the resin coated particles used in forming the slurry include at least one of pre-cured resin coated particles and non-pre-cured resin coated particles; the resin coated particles used in forming the slurry are non-pre-cured resin coated particles; the coarse particles include coarse particles having a particle size of from about 1 mm or more and coarse particles having a particle size of from about 0.2 mm to less than about 1 mm that are used in a ratio of from about 4:1 to about 1:2, respectively, by total weight of particles; the particles provide a particle pack having a void volume of less than about 17% prior to any particle deformation; the coarse particles are used in an amount of from about 30 to about 95 percent by total weight of particles, and the smaller particles having a particle size of from about 0.1 mm to less than about 0.2 mm are used in an amount of from 0 to about 30% by total weight of particles, and smaller particles having a particle size of less than about 0.1 mm are used in an amount of 0 to about 20% by total weight of particles.

BRIEF DESCRIPTION OF THE DRAWINGS

For a more complete understanding of the present invention, reference is now made to the following descriptions taken in conjunction with the accompanying figures, in which.

DETAILED DESCRIPTION

Figure 1:
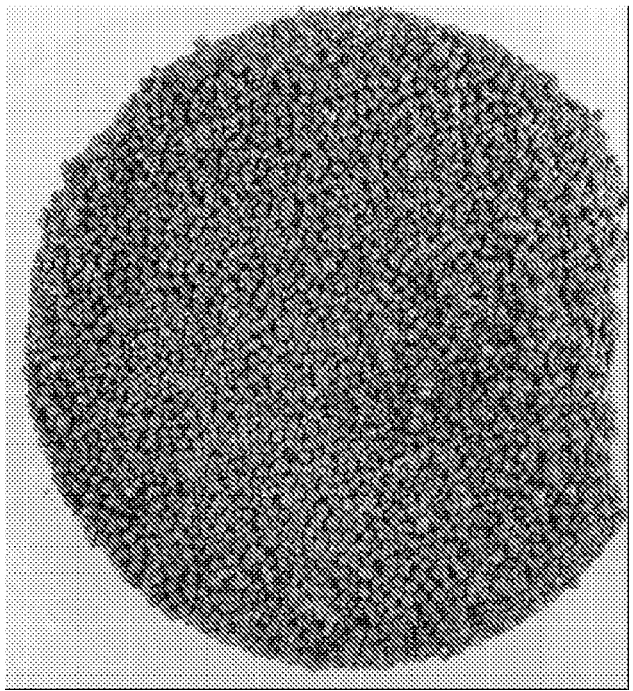
FIG. 1 shows a resin coated particle pack that exhibited generally uniform consolidation.

As it is desirable to produce the maximum flow rate along a fracture, the fracture may be created in such a way as to have the greatest permeability and width, to maximize flow and minimize pressure drop along the fracture. This is typically achieved by placing in the fracture a hard material (called a proppant) that may be (as nearly as practicable) round, large and uniform in particle size. This gives the greatest porosity (pore volume) and pore size (pore diameter). High porosity and large pores make the proppant bed highly permeable. The porosity of a propped fracture may be in the range of 30-42% of the volume of the fracture.

U.S. Pat. No. 7,004,255 to Boney, which is herein incorporated by reference in its entirety, described that it is possible to fill a fracture with an inert particulate material that has a very low permeability and will block off liquid or gas flow along the fracture. The particles can be placed in a fracture to plug or partially plug the fracture; the pack will, by design, have very different properties from the collection of particles typically placed in a fracture to maximize pore volume and pore diameter. The particle sizes in embodiments of Boney are optimized to give the lowest porosity with the smallest and fewest pores. This is done by selection of the proper materials and size distributions for the particles placed in the fracture to be plugged. Examples of the uses of size ranges to affect filling are given in U.S. Pat. No. 5,518,996.

As described in Boney, the use of particles of different size distributions facilitates the reduction of fluid leakoff, thus limiting the fracture height growth. The size distribution of the particles is designed to provide a void space of no more than 17%. Boney discusses the use of a combination of "coarse," "medium," and/or "fine" particles. As described, the larger "coarse" particles may have a particle size of from about 0.2 mm to about 2.35 mm. The "medium" particles may be from about 0.1 mm to about 0.2 mm. The "fine" particles may have a particle size of less than about 0.1 mm.

It should be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

While such technique of Boney effectively reduces the fluid flow capacity of the fracture, the inert particles used may not completely fill or plug smaller pores of the fracture, so that some fluid may still leak off. Additionally, the inert particles may eventually become dislodged and migrate from the fracture. This may be undesirable, particularly, in low pressure wells that require the use of pumps, such as the electric submersible pumps, used for downhole lifting of well fluids. Particles that migrate from the fracture and are contained in such well fluids can damage the pumps and other equipment.

The present invention makes use of resin coated particles (RCP) with other particles of various sizes. As described in Boney, a reduction of permeability is provided merely by the size distribution of particles used. In the present invention, reduction of permeability may be achieved not only from the size distribution of the particles, but from the materials used for the particular particles.

The RCP may constitute "coarse" particles and have a particle size distribution ranging from about 0.2 mm to approximately 2.35 mm or more. The coarse RCP may be used in an amount of from about 30 to about 95% by total weight of particles when RCP constitutes all of the coarse material. Where coarse non-resin-coated particle (non-RCP) material is used in combination with coarse RCP, lesser amounts of the coarse RCP may be used. The RCP and non-RCP can also have different size distributions within this "coarse" range. Thus, the coarse RCP or non-RCP may include larger coarse particles having a particle size of from about 1 mm or more, with smaller coarse particles having a particle size of from about 0.2 mm to less than 1 mm. The larger and smaller coarse particles may be used in a ratio of from about 4:1 to about 1:2, respectively, by total weight of particles. Smaller RCP having a particle size of less than 0.2 mm may be used as well.

The RCP may include both pre-cured resin coated particles and/or initially uncured resin coated particles. RCP that includes partially cured resin or that initially includes both pre-cured and uncured resin may also be used. The particles may be selected so that they do not interfere with the viscosifying chemicals if the carrier fluid is viscosified and so that they are generally not soluble in the carrier fluid or in fluids whose flow they are intended to impede or prevent. The resin coated particles may include an inert, non-deformable core of, for example, ceramic, glass, sand, bauxite, inorganic oxides (e.g. aluminum oxide, zirconium oxide, silicon dioxide, bauxite), etc., that is completely or substantially coated with a resin coating. The resins used may include, for example, epoxy, phenolic (e.g. phenol-formaldehyde), polyurethane elastomers, amino resins, polyester resins, acrylic resins, etc. Examples of resin coated particles are described in U.S. Pat. Nos. 3,929,191, 4,585,064 and 5,422,183, which are each herein incorporated by reference in their entireties. The coating thickness may vary, but resin coatings that make up of from about 1 to about 99% by total weight of RCP may be used, more particularly from about 1 to about 50% by total weight of RCP. The resin coating may be of such a thickness over the non-deformable core so that the RCP generally retains its size and shape during placement and/or use, although deformation of the resin coating may still occur.

For non-cured resin coated particles, these are coated particles where the resin is initially uncured when the particle slurry is initially formed, as is discussed more fully below. The non-cured RCP may initially be generally solid and non-tacky at surface conditions, thus facilitating handling and preparation of the particle slurry, as the particles do not tend to stick together. Upon introduction into the fracture in the subterranean formation, the resin will soften due to the higher temperatures encountered. Subsequently, the resin cures or crosslinks so that it becomes hard and infusible, with some flexibility. Typical temperatures that facilitate curing range from about 40° C. to about 250° C. At lower temperatures, i.e. temperatures of less than about 60° C., curing aids may be used to provide sufficient consolidation within a reasonable length of time. Such curing aids are known by those skilled in the art and may include, for example, isopropanol, methanol and surfactants with alcoholic compounds.

Curing or crosslinking of the resin may occur merely due to heating. The resin may be selected so that curing occurs at particular temperatures and so that certain time periods may be required for curing to ensure that the resin does not cure too quickly. Resins having cure times of from about 1 hour to about 75 hours or more may be used to ensure that sufficient time is allowed for positioning of the particle pack.

Pre-cured resin coated particles includes those resin coated particles where the resin has been at least partially cured or crosslinked at the surface prior to introduction into the well or fracture. Such pre-cured RCP may be particularly useful with fracturing fluids as they may be more compatible with fracturing fluids and do not require temperature for activation. The pre-cured resin coated particles may only interact physically with each other, with no chemical bonding. As a result, a thicker resin coating may be required compared to uncured RCP. The coatings used may be flexible ones that can be easily deformed under pressure. This coupled with thicker coating on the particle surface will give rise to stronger interactions between particles. Such materials include rubbers, elastomers, thermal plastics or plastics.

Examples of suitable commercially available non-cured resin coated particles include Super HS, Super LC, Super TF, Super HT, MagnaProp, DynaProp, OptiProp and PolaProp, all available from Santrol, Inc., Fresno, Calif., U.S.A., and Ceramax resin coated proppants, available from Borden Chemical, Columbus, Ohio, U.S.A. The resin coated particles may also include particles having a tackifying or similar coating that provides similar characteristics to the RCP previously described, such as the coated sand marketed under the name SandWedge, available from Halliburton Energy Services, Inc., Houston, Tex., U.S.A., which may be added on the fly to the slurry.

The particles used in combination with the RCP may have particle size distributions that are the same or smaller than that of the RCP used. Typically, the particles used in combination with the RCP are smaller than the RCP, with the size distributions being the same as those disclosed in Boney for the "medium" and "fine" particles. In the present invention, the "medium" sized particles have a particle size of from about 0.1 mm to about 0.2 mm. The "fine" particles have a particle size of less than 0.1 mm. Non-RCP coarse particles may also be used with the RCP. The non-RCP coarse particles may be used in an amount up to about 20% by total weight particles.

The particles used in combination with the RCP may be non-resin-coated particles that are deformable. As used herein, the term "deformable" refers to the characteristic of the particle or material to change its shape when the particle is subjected to sufficient force without substantial breaking apart or fragmentation of the particle. Deformable is meant to include both malleable and elastic materials. As used herein, "malleable" refers to the characteristic of the material to generally retain its new shape after deformation, whereas "elastic" refers to the characteristic of the material to return substantially to its original shape and size after deformation. These non-resin-coated, deformable particles may be formed from such materials as thermoplastics, pure resin (which may be pre-cured resin), rubber, polymer beads, aluminum or aluminum alloys, walnut shells, plastics, etc.

Particles having a non-deformable core coated with a deformable coating may be employed as the deformable particles. The deformable coatings may be malleable or elastic. Resin coated particles having a high volume of resin over a non-deformable core may also be employed as the deformable particles. Such deformable resin coated particles may have a resin coating of greater than 50% by weight of the particle so that there is a sufficient amount of deformable resin material so that the particle may change its overall shape. The deformable resin coated particles may have a smaller particle size than the non-deformable resin coated particles used.

Non-deformable, non-resin-coated particles may be used with the RCP as well. These particles may be chemically inert and may include sand and other materials such as barite, fly ash, fumed silica, other crystalline or amorphous silicas, talc, mica, ceramic beads, carbonates, or taconite. Any materials that will retain their particle size and shape during and after placement and that will not cause the placement fluid to fail may be acceptable. If coarse non-deformable particles are used with the RCP, the RCP may be provided with a resin coating sufficiently thick to provide further reductions in particle pack permeability resulting from the coating deformation.

Lightweight or low density particle materials may also be used in certain applications. These may be of different sizes. These may include hollow spherical materials, such as glass spheres. Examples of such hollow spherical materials are those available commercially from Schlumberger Technology Corporation, New York, N.Y., U.S.A., as LITEFILL (e.g. D124 LITEFILL). Other lightweight composite materials, such as the cellulosic particles that have been impregnated with and encapsulated in, a pre-cured resin coating, and marketed under the name LiteProp, available from BJ Services Company, Houston, Tex., U.S.A., may also be used.

In another aspect of the invention, coarse particles having a non-deformable core that are coated with a deformable non-resin coating such that the coating will deform to provide a tighter particle pack may be employed in place of the resin coated particles. These particles may be used as the coarse material, along with smaller non-deformable or deformable particles. An example of such a material is the FlexSand product, available from BJ Services Company.

The smaller particles, either deformable or non-deformable, may be selected to be large enough to bridge in the pore spaces formed by the larger material but not small enough to flow through the pore throats in the pack of larger particles. If this does not reduce the pore volume (void volume) of the fracture down to 17% or less of the volume of the fracture, then a third material, even smaller than the second material, may be added to the mixture to reduce the porosity further. The third material may have the same size requirements relative to the second material as the second material does to the first. The optimal goal is to reduce the pack porosity to 17% or less. This is based upon the shape and size of the particles prior to or without any particle deformation.

The selection of the smaller particle sizes is guided by the understanding that a region filled with regularly arranged spheres of equal size will have a void volume of about 36%. Furthermore, if a second set of equal-sized spheres that are about one tenth the size of the first set are included, the smaller spheres will tend to reside in the voids between the larger spheres, and the resulting void volume will be about 23%. Finally, if a third set of equal-sized spheres that are about one tenth the size of the second set are included, the final void volume will be about 15%. A mixture of from about 30 to about 95% by total weight of particles of the coarse particles, 0 to 30% by total weight of particles of the medium particles, and 0 to 20% by total weight of particles of the fine particles may be suitable in many applications. These guidelines are generally accurate for the normal situation in which the particles are not perfect spheres, are not uniform in size, and are not perfectly packed. A situation in which the void volume is minimized is said to have maximum compaction.

If two sizes are used instead of three, they could be "medium" and "fine", or "coarse" and "fine". Although the ranges of the definitions of "coarse", "medium" and "fine" have been given as contiguous, the actual sizes used may not be contiguous. For example, although the coarse RCP may be from about 0.2 mm to approximately 2.35 mm and "medium" may be from about 0.1 mm to about 0.2 mm in diameter, actual sizes used in a treatment might be about 1 to 2 mm and about 0.1 to 0.2 mm respectively. Additionally, different size distributions of particle sizes within each of the coarse, medium and fine particle sizes may also be used.

The goal in certain embodiments of the invention may not necessarily be to leave the minimal possible void volume in a particle pack in a fracture (and thus to stop completely all fluid flow through a fracture), but only to reduce the void volume substantially in order to reduce the ability of fluids to flow through the particle pack in the fracture. As used herein, the term "fracture" is meant to include a portion of a fracture. Thus, in some cases, the choices of the types of particles and the number of particle size ranges, the particle size distributions within each range of particles, the differences between the sizes of the ranges, the amounts of the ranges, and other factors may be made on the basis of economics, expedience, or simplicity, rather than on the need for optimal filling. This is significantly different from such operations as cementing, where any failure to fill a void completely could be disastrous. For example, the average particle in each size range of particles in embodiments of the present invention may be approximately 5-12 times the size of the next smallest.

The use of smaller deformable particles in combination with the larger or coarse RCP can facilitate bringing the permeability of the fracture or portion of the fracture to zero or very close to zero. This is due to the deformation of the particles under pressure so that the particles more completely fill the smaller pore spaces of the formation and the particle pack, thus occupying more pore space. In contrast, non-deformable particles tend to fragment or be crushed, forming even smaller particles that may not close off the pore spaces as effectively or that may migrate out of the pores. The resin coated particles also have some degree of malleability provided from their outer resin coatings. The inert non-deformable core, however, prevents complete deformability. If solid resin particles, or other particles that provide adhesion or tackiness, are used, these may provide additional strength and facilitate prevention of particle migration.

In addition to reducing permeability of the fracture, the use of the RCP with smaller non-resin coated particles also provides a particle interaction that prevents migration of the particles, including the smaller non-resin coated particles and fines that may be formed by particle crushing. Particle crushing (for example proppant crushing) may also be reduced. The resin of the RCP binds both resin coated and the non-resin coated particles together. The RCP/non-RCP particles form a strong, generally uniform consolidated particle pack that is not prone to breaking apart. As used herein, "generally uniform" is meant to encompass the consolidation of the particle pack throughout its entire extent as contrasted with merely consolidated fragments or only portions of the particle pack being consolidated, although a few or nominal number of particles may still remain free or unconsolidated.

In forming the particle pack, when the particles are suspended in a suitable carrier fluid, the particle mixture is called the "filling slurry". The carrier fluid is more fully described below. The concentration of particles in the slurry described may be much less than the typical concentration of particles in a cement slurry. Cements may be very concentrated slurries, typically having total particle concentrations of about 50 volume % or more. The slurries of embodiments of the present invention may be much more dilute, and may, for example, have total particle concentrations of from about 0.05 kg/L to about 2 kg/L, and for another example, from 0.1 to 1.5 kg/L. In embodiments of the invention in which the fracture closes on the particles, the particles may become concentrated in the slurry as fluid leaks off, and the particle concentration in the fracture, after the fracture has closed, when the particle pack is fully compacted, may be comparable to that in a set cement.

The particles may be mixed and pumped using equipment and procedures commonly used in the oilfield, for example, for cementing, hydraulic fracturing, drilling, and acidizing. Particles may be pre-mixed or mixed on site. If premixed, the particles may be selected or provided in a condition so that they do not interact or stick to one another, and so that the different particle sizes do not separate from one another. They are generally mixed and pumped as a slurry in a carrier fluid such as water, oil, viscosified water, viscosified oil, emulsions, cross-linked, energized or foamed fluids (for example with nitrogen or $CO_2$ gas) and slick water (water containing a small amount of polymer or viscoelastic surfactant that serves primarily as a friction reducer rather than primarily as a viscosifier). If the fluid is an emulsion or foam, the concentrations given here are for the particles in the aqueous phase. The particles may have a very high density, and/or the carrier fluid may have a very low density, and/or the pump rate may be very low. If so, the carrier fluid may be viscosified in order to facilitate suspending the particles.

The carrier fluid may be any conventional fracturing fluid that allows for material transport to entirely cover the fracture, stays in the fracture, and maintains the material in suspension while the fracture closes. Crosslinked or uncrosslinked guars or other polysaccharides may be used. Crosslinked or uncrosslinked polyacrylamide is a commonly used viscosifying agent. Crosslinked polyacrylamides with additional groups such as AMPS may be selected because of their chemical and thermal stability. Such materials concentrate in the fracture and resist degradation, thus providing additional fluid flow resistance in the pore volume not filled by particles. In higher permeability formations, where there would be concern about unwanted fluid flow into the fracture from the formation after the treatment, a hydroxyethylcellulose system or uncrosslinked polymer that may leak off into the matrix and impede flow in the matrix pores may help prevent flow into the fracture from the formation. These different types of viscosifiers may be used together to give resistance to both types of flow (within the fracture and into the fracture). Additionally, wall-building materials, such as fluid loss additives, may be used to further impede flow from the formation into the fracture. Wall-building materials such as starch, mica, and carbonates are well known. (Of course, for injection wells, discussions of flow from the formation into the fracture are meant to encompass discussions of flow from the fracture into the formation.)

Various methods of viscosifying the carrier fluid may be used. Water may be viscosified with a polymer, which may be crosslinked. The polymer, especially if it is crosslinked, may remain and be concentrated in the fracture after the treatment and impede fluid flow. In fracturing, the polymers are commonly crosslinked to increase viscosity with a minimum amount of polymer. In certain embodiments of the present invention, more polymer may used than in other instances. In fracturing, the polymer may be selected so that it decomposes after the treatment, so the polymer may be selected so that it will survive long enough to place the particles before decomposing. A breaker may be added so that the polymer survives long enough to place the material and then decompose after the treatment. In certain embodiments of the present invention, stable polymers, such as the polyacrylamides, substituted polyacrylamides, and others may be useful, or less or more breaker may be used. The choice of polymer, its concentration, and crosslinking agent and/or breaker, if any of either or both, may be made by balancing these factors for effectiveness, taking cost, expediency, and simplicity into account.

Placement of the plugging material of the invention is similar to the placement of proppant in hydraulic fracturing. The particle mixture is suspended in a carrier fluid to form the filling slurry. If a fracture is being created and plugged at the same time, a hydraulic fracture simulator may be used to design the fracture job and simulate the final fracture geometry and filling material placement. If an existing fracture is being plugged, a simulator may not be used. Examples of a P3D simulator are FracCADE a (a Schlumberger proprietary fracture design, prediction and treatment-monitoring software), Fracpro sold by Pinnacle Technologies, Houston, Tex., U.S.A., and MFrac from Meyer and Associates, Inc., Natrona Heights, Pa., U.S.A. Other commercially available P3D software may also be used.

Whether a fracture is being created and plugged in a single operation, or an existing fracture is being plugged, the fracture wall(s) is/are typically covered top-to-bottom and end-to-end ("length and height" for a typical vertical fracture in a vertical well) with filling slurry where the unwanted fluid flow is or is expected. It may not be necessary to completely fill the width of the created fracture completely with material while pumping. Enough material may be pumped to a) create a full layer of the largest ("coarse") size material used across the entire length and height of the region of the fracture where flow is to be impeded if the fracture is going to close after placement of the plugging material, or to b) fill the fracture volume totally with material.

When at least situation a) has been achieved, the fracture will be said to be filled with at least a monolayer of coarse particles. The normal maximum concentration needed may be three layers (between the faces of the fracture) of the coarse material, assuming that the spaces between the coarse particles are filled with smaller particles. If the fracture is wider than this, but will close, three layers may be all the filling material needed, provided that after the fracture closes, substantially the length and height of the fracture walls are covered. If the fracture is wider than this, and the fracture will not subsequently close, then either a) more filling material may be pumped to fill the fracture, or b) some other material may be used to fill the fracture. More than three layers may be wasteful of particulate material, may allow for a greater opportunity of inadvertent voids in the particle pack, and may allow flowback of particulate material into the wellbore. Therefore, especially if the fracture volume filled-width is three times the largest particle size or greater, then a malleable bridging material may be added to reduce the flow of particles into the wellbore. This may be a material that does not increase the porosity of the pack on closure. Malleable polymeric or organic fibers are products that effectively accomplish this. Concentrations of up to about 9.6 g malleable bridging fiber material per liter of carrier fluid may be used.

It may be necessary to plug only a portion of the fracture; this may occur when the fracture is growing out of the desired region into a region in which a fracture through which fluid can flow is undesired. This plugging of a portion of the fracture can be achieved using embodiments of the invention if the area to be plugged is at the top or at the bottom of the fracture. There are several techniques that may be used to achieve this; each may be used with either a cased/perforated completion or an open hole completion. In the first ("specific gravity") technique, the filling slurry is pumped before pumping of the main fracture slurry (main proppant slurry) and has a specific gravity different from that of the main fracture slurry. Alternatively, the operator may switch to pumping the filling slurry for a period during the job. If the filling slurry is heavier (denser) than the main fracture slurry, then the plugged portion of the fracture may locate at the bottom of the fracture. If the filling slurry is lighter (less dense) than the main fracture slurry, then the plugged portion of the fracture may locate at the top of the fracture. The filling slurry may be lighter or heavier than the main proppant slurry simply because the particles are lighter or heavier than the proppant; the difference may be enhanced by also changing the specific gravity of the carrier fluid for the particles relative to the specific gravity of the carrier fluid for the proppant.

A second ("placement") technique is to run tubing into the wellbore to a point approximately above or below the perforations. If the objective is to plug the bottom of the fracture, then the tubing may be run to a point below the perforations, and the filling slurry is pumped down the tubing while the primary fracture treatment slurry is pumped down the annulus between the tubing and the casing. This forces the filling slurry into the lower portion of the fracture. If the objective is to plug the top of the fracture, then the tubing is run into the wellbore to a point above the perforations. Then, when the filling slurry is pumped down the tubing while the primary fracture treatment slurry is being pumped down the annulus between the tubing and the casing, the filling slurry is forced into the upper portion of the fracture. The tubing may be moved during this operation to aid placement of the particles across the entire undesired portion of the fracture. Coiled tubing may be used in the placement technique.

In another placement method, the filling slurry is pumped as the initial stage or during the PAD treatment and is therefore placed in front of the main proppant laden slurry. A coarse particle bridge is formed in the higher stress barrier zones above and below the pay zone and creates a bed for the smaller particles to fill the pore spaces until the reduction in permeability in the packed bed is such that the flow is significantly reduced. This enables a tight particle bed that prevents further flow of fluid through the bed and also provides a mechanical barrier that supports the stress difference between the pay section with lower stress and the barrier zone, which is typically shale.

Although the methods described here are most typically used for hydrocarbon production wells, they may also be used in storage wells and injection wells, and for wells for production of other fluids, such as water, carbon dioxide, or brine.

The following example further illustrates the invention:

EXAMPLE

Example 1

Particle packs were formed using the non-precured RCP particle materials, as presented in Table 1 below.

TABLE 1

|  | Particle Material | Particle Size (Mesh) | Amount Used (Volume %) | Result |
|---|---|---|---|---|
| Sample 1 | Santrol RCP | 12/18+ | 66.7 | Uniform consolidated pack formed. |
|  | Non-RCP Proppant | 20/40 | 33.3 |  |
| Sample 2 | Fores RCP | 12/18+ | 70 | Only portions of pack consolidated. |
|  | Non-RCP Proppant | 20/40 | 15 |  |
|  | Silica | 100 | 15 |  |
| Sample 3 | Carbo RCP | 12/18+ | 66.7 | Uniform consolidated pack formed. |
|  | Non-RCP Proppant | 20/40 | 33.3 |  |
| Sample 4 | Carbo RCP | 12/18+ | 70 | Uniform consolidated pack formed. |
|  | Non-RCP Proppant | 20/40 | 15 |  |
|  | Sand | 100 | 15 |  |

Figure 2:
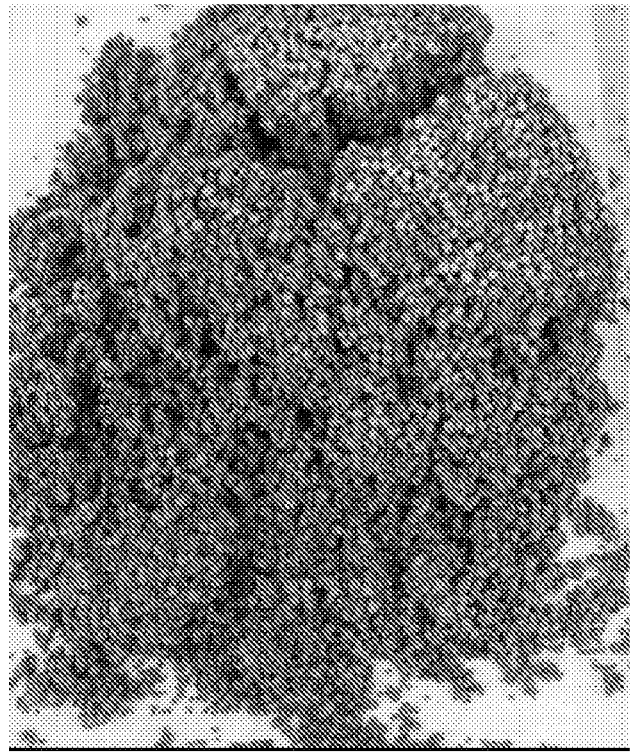
FIG. 2 shows a resin coated particle pack that failed to provide generally uniform consolidation.

Slurries of the particles mixtures were formed with a broken fracturing fluid having a final viscosity of 75 cP at 23° C. and a pH of 6.3. The slurries were poured into 3 inch (7.62 cm) diameter press cells. The cells were pressed with a grip vise. The pressed cells were then placed in an oven preheated to 90° C. for approximately 20 hours. After removing from the oven, the proppant pack was then removed from each cell. As shown in FIG. 1, Sample 1 formed a strong, generally uniform consolidated proppant pack. As shown in FIG. 2, the proppant pack of Sample 2 broke apart with only portions being consolidated. Samples 3 and 4 (not shown) also formed uniform consolidated proppant packs. The mesh sizes are as follows: 12/18 is from about 1.00 to about 1.70 mm; 20/40 is from about 0.425 to about 0.850 mm; and 100 mesh is about 0.150 mm. The Santrol RCP was curable resin coated Santrol SHS, available from Santrol, Fresno, Tex., U.S.A. The Fores RCP and Carbo RCP materials were coated ceramics manufactured in Russia; the Carbo RCP was made in the Carbo Ceramics plant in Chelyabinsk, Russia. The non-RCP proppant material was a ceramic made by Borovichi Refractories Plant, Borovichi, Russia.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of treating a formation penetrated by a wellbore comprising:

providing a quantity of resin coated particles having a particle size of from about 0.2 mm to about 2.35 mm, and a quantity of smaller particles having a particle size of less than about 0.2 mm that form a generally uniform consolidated particle pack when mixed together and subjected to at least one of heat and pressure;

forming a slurry of the particles with a carrier fluid capable of suspending the particles; and introducing the slurry of particles into the wellbore of the formation, whereby the resin coated particles and smaller particles form a consolidated particle pack in at least a portion of the formation, and whereby the particles provide a particle pack having a void volume of less than about 17% prior to any particle deformation.

2. The method of claim 1, wherein: the resin coated particles are used in an amount of about 30 to about 95 percent by total weight of particles.

3. The method of claim 1, wherein: the smaller particles include deformable particles formed from at least one of thermoplastic, resin, rubber, polymers, walnut shells, aluminum and aluminum alloys and plastics.

4. The method of claim 1, wherein: the resin coated particles used in forming the slurry include at least one of pre-cured resin coated particles and non-pre-cured resin coated particles.

5. The method of claim 1, wherein: the resin coated particles used in forming the slurry comprise non-pre-cured resin coated particles.

6. The method of claim 1, wherein: the particles form a generally uniform consolidated particle pack when subjected to pressure at 90° C. for 20 hours.

7. The method of claim 1, wherein: the smaller particles are at least one of deformable particles and non-deformable particles having a particle size of about 0.2 mm or less.

8. The method of claim 1, wherein: the resin coated particles include resin coated particles having a particle size of from about 1 mm or more and resin coated particles having a particle size of from about 0.2 mm to less than about 1 mm that are used in a ratio of from about 4:1 to about 1:2, respectively, by total weight of particles.

9. The method of claim 1, wherein: the resin coated particles are used in an amount of from about 30 to about 95 percent by total weight of particles, and wherein smaller particles having a particle size of from about 0.1 mm to less than about 0.2 mm are used in an amount of from 0 to about 30% by total weight of particles, and smaller particles having a particle size of less than about 0.1 mm are used in an amount of 0 to about 20% by total weight of particles.

10. A method of treating a formation penetrated by a wellbore comprising:

providing a quantity of coarse particles having a particle size of from about 0.2 mm to about 2.35 mm that includes at least one of resin coated particles selected from the group consisting of include pre-cured resin coated particles and non-pre-cured resin coated particles, and mixtures thereof and particles having a non-resin deformable coating over a non-deformable core, and a quantity of particles having a particle size of less than about 0.2 mm that includes at least one of deformable and non-deformable particles;

forming a slurry of the particles with a carrier fluid capable of suspending the particles; and introducing the slurry of particles into the wellbore of the formation;

wherein the particles provide a particle pack having a void volume of less than about 17% prior to any particle deformation.

11. The method of claim 10, wherein: the coarse particles are used in an amount of about 30 to about 95 percent by total weight of particles.

12. The method of claim 10, wherein: the smaller particles include deformable particles formed from at least one of thermoplastic, resin, rubber, polymers, walnut shells, aluminum and aluminum alloys and plastics.

13. The method of claim 10, wherein: the resin coated particles used in forming the slurry are non-pre-cured resin coated particles.

14. The method of claim 10, wherein: the coarse particles include coarse particles having a particle size of from about 1 mm or more and coarse particles having a particle size of from about 0.2 mm to less than about 1 mm that are used in a ratio of from about 4:1 to about 1:2, respectively, by total weight of particles.

15. The method of claim 10, wherein: the coarse particles are used in an amount of from about 30 to about 95 percent by total weight of particles, and wherein the smaller particles having a particle size of from about 0.1 mm to less than about 0.2 mm are used in an amount of from 0 to about 30% by total weight of particles, and smaller particles having a particle size of less than about 0.1 mm are used in an amount of 0 to about 20% by total weight of particles.

* * * * *